United States Patent
Venkatapathy et al.

(10) Patent No.: US 8,983,211 B2
(45) Date of Patent: Mar. 17, 2015

(54) METHOD FOR PROCESSING OPTICAL CHARACTER RECOGNIZER OUTPUT

(75) Inventors: Sriram Venkatapathy, Grenoble (FR); Nicola Cancedda, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 254 days.

(21) Appl. No.: 13/470,434

(22) Filed: May 14, 2012

(65) Prior Publication Data

US 2013/0301920 A1    Nov. 14, 2013

(51) Int. Cl.
  *G06K 9/72* (2006.01)
  *G06K 9/18* (2006.01)
  *G06F 17/27* (2006.01)
  *G06K 9/03* (2006.01)
  *G06F 17/28* (2006.01)

(52) U.S. Cl.
  CPC .......... *G06F 17/273* (2013.01); *G06K 9/03* (2013.01); *G06F 17/289* (2013.01); *G06K 9/72* (2013.01)
  USPC .......................................... 382/229; 382/182

(58) Field of Classification Search
  CPC ............ G06F 17/2715; G06F 17/2785; G06F 17/2827; G06F 17/2863; G06K 9/344; G06K 9/00; G06K 9/72
  USPC ..................... 382/182–185, 229–231, 321
  See application file for complete search history.

(56) References Cited

U.S. PATENT DOCUMENTS

| | | | |
|---|---|---|---|
| 4,754,489 A * | 6/1988 | Bokser | 382/230 |
| 5,133,023 A * | 7/1992 | Bokser | 382/230 |
| 5,261,009 A * | 11/1993 | Bokser | 382/230 |
| 5,467,425 A * | 11/1995 | Lau et al. | 704/243 |
| 5,761,687 A * | 6/1998 | Hon et al. | 715/271 |
| 5,802,205 A * | 9/1998 | Emico et al. | 382/187 |
| 5,854,855 A * | 12/1998 | Errico et al. | 382/187 |
| 6,341,176 B1 * | 1/2002 | Shirasaki et al. | 382/229 |
| 6,848,080 B1 * | 1/2005 | Lee et al. | 715/203 |
| 7,120,302 B1 * | 10/2006 | Billester | 382/229 |
| 7,130,487 B1 * | 10/2006 | Imagawa et al. | 382/280 |
| 7,165,019 B1 * | 1/2007 | Lee et al. | 704/2 |
| 7,499,588 B2 * | 3/2009 | Jacobs et al. | 382/182 |
| 8,498,864 B1 * | 7/2013 | Liang et al. | 704/235 |
| 8,682,648 B2 * | 3/2014 | Popat | 704/9 |
| 8,706,472 B2 * | 4/2014 | Ramerth et al. | 704/2 |
| 2001/0009009 A1 * | 7/2001 | Iizuka | 707/539 |
| 2004/0255218 A1 * | 12/2004 | Tada et al. | 714/747 |
| 2007/0150257 A1 * | 6/2007 | Cancedda et al. | 704/2 |
| 2008/0126415 A1 * | 5/2008 | Chaudhury et al. | 707/104.1 |
| 2008/0243481 A1 * | 10/2008 | Brants et al. | 704/9 |
| 2008/0279455 A1 * | 11/2008 | Wall | 382/187 |
| 2010/0246963 A1 * | 9/2010 | Al-Muhtaseb et al. | 382/185 |
| 2012/0324391 A1 * | 12/2012 | Tocci | 715/773 |
| 2013/0301920 A1 * | 11/2013 | Venkatapathy et al. | 382/182 |
| 2014/0169694 A1 * | 6/2014 | Yoshikawa et al. | 382/260 |

OTHER PUBLICATIONS

Genzel et al., Translation-Inspired OCR, 2011 International Conference on Document Analysis and Recognition (Sep. 21, 2011).*
China Association of Automation et al., 2011 International Conference on Document Analysis and recognition Program Guide (Sep. 21, 2011).*
Cancedda et al., "A Statistical Machine Translation Primer", NRC Publications Archive, 2009.*

* cited by examiner

*Primary Examiner* — Aaron W Carter

(57) ABSTRACT

A method, a system, and a computer program product for processing the output of an OCR are disclosed. The system receives a first character sequence from the OCR. A first set of characters from the first character sequence are converted to a corresponding second set of characters to generate a second character sequence based on a look-up table and language scores.

20 Claims, 12 Drawing Sheets

118a

| SOURCE CHARACTER | TARGET CHARACTER | P(T\|S) |
|---|---|---|
| r | <s> r | 0.000210196 |
| r | e r | 0.000630589 |
| r | e | 0.000420393 |
| r | f | 0.000630589 |
| r | h r | 0.000420393 |
| r | h | 0.000210196 |
| r | i n | 0.000210196 |
| r | i | 0.00108861 |
| r | l u | 0.000210196 |
| r | l | 0.000840785 |
| r | m | 0.000840785 |
| r | n | 0.00413673 |
| r | n | 0.00130634 |
| r | r " | 0.363515 |
| r | r <s> | 0.00217723 |
| r | r : | 0.000630589 |
| r | r | 0.979534 |

FIG. 4A

| SOURCE CHARACTER | TARGET CHARACTER | P(T\|S) |
|---|---|---|
| p | " p | 0.00417936 |
| p | <s> p | 0.00417936 |
| p | , | 0.00208968 |
| p | 0 | 0.00208968 |
| p | d | 0.00208968 |
| p | e | 0.00835871 |
| p | l o | 0.00208968 |
| p | n | 0.00417936 |
| p | o | 0.00626904 |
| p | p | 0.952381 |
| p | r | 0.00626904 |
| p | s | 0.00208968 |
| p | x p | 0.00208968 |

FIG. 4B

METHOD FOR PROCESSING OPTICAL CHARACTER RECOGNIZER OUTPUT

COPYRIGHT NOTICE

A portion of the disclosure of this patent document contains material that is subject to copyright protection. The copyright owner has no objection to facsimile reproduction by anyone of the patent document or the patent disclosure as it appears in the Patent and Trademark Office patent file or records but otherwise reserves all copyright rights whatsoever.

TECHNICAL FIELD

The presently disclosed embodiments are directed to language translation, such as, machine translation of documents. More particularly, the presently disclosed embodiments are directed to a technique for correcting the output of an Optical Character Recognizer (OCR).

BACKGROUND

Machine Translation (MT) systems are increasingly being used in various business processes for breaking the language barrier. In scenarios where hard-copies of documents need to be translated automatically, the MT systems can be used after the documents are processed by an OCR. The output of the OCR might be noisy. The noise refers to various possible errors such as, but not restricted to, character replacement or segmentation errors. In case of a character replacement error, a character in an image is wrongly recognized as a different character or a sequence of characters. In case of segmentation errors, either a space between two words is not recognized or one or more extra spaces are inserted in the middle of a word. Such noisy output may result in faulty translation by the MT system. Further, correcting such errors manually takes considerable time and effort.

SUMMARY

According to aspects illustrated herein, there is provided a computer implemented method, a system, and a computer program product for processing the output of an OCR. The system receives a first character sequence from the OCR. A first set of characters from the first character sequence are converted to a corresponding second set of characters to generate a second character sequence based on a look-up table and language scores generated by a language model.

According to aspects illustrated herein, there is provided a computer implemented method, a system, and a computer program product for language translation. The system receives a first character sequence in first language from an OCR. A first set of characters from the first character sequence are converted to a corresponding second set of characters to generate a second character sequence in the first language. The conversion is based on a look-up table and language scores. A first word sequence corresponding to the second character sequence is then translated to a second word sequence in a second language.

According to aspects illustrated herein, there is provided a computer implemented method and a computer program product for processing the output of an OCR. The method includes receiving a first character sequence from the OCR. A first set of characters from the first character sequence is converted to a corresponding second set of characters to generate a second character sequence based on one or more finite state transducers (FSTs) corresponding to each character of the first character sequence and language scores generated by a language model, where, weights associated with the one or more FSTs and the language model are determined using a Minimum Error Rate Training (MERT) technique.

BRIEF DESCRIPTION OF DRAWINGS

The accompanying drawings, which are incorporated in, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Various embodiments will hereinafter be described in accordance with the appended drawings provided to illustrate and not to limit the scope in any manner, wherein like designations denote similar elements, and in which:

FIG. 4a depicts a look-up table in accordance with an embodiment;

FIG. 4b depicts another look-up table in accordance with an embodiment;

DETAILED DESCRIPTION

The present disclosure is best understood with reference to the detailed figures and description set forth herein. Various embodiments are discussed below with reference to the figures. However, those skilled in the art will readily appreciate that the detailed description given herein with respect to the figures is just for explanatory purposes as the method and the system extend beyond the described embodiments. For example, those skilled in the art will appreciate that, in light of the teachings presented, multiple alternate and suitable approaches can be realized, depending on the needs of a particular application, to implement the functionality of any detail described herein, beyond the particular implementation choices in the following embodiments described and shown.

Machine translation (MT) systems are increasingly used in various business processes to convert documents from one language to another. In order to translate a document, a user scans the document using a suitable scanner. The scanned document is then processed with suitable OCR to optically recognize characters in the scanned document. However, at times, the output of the OCR may be noisy and may need correction before translation by the MT system. Various embodiments of a method and a system for correcting such errors will be explained with the help of accompanying description.

Figure 1:
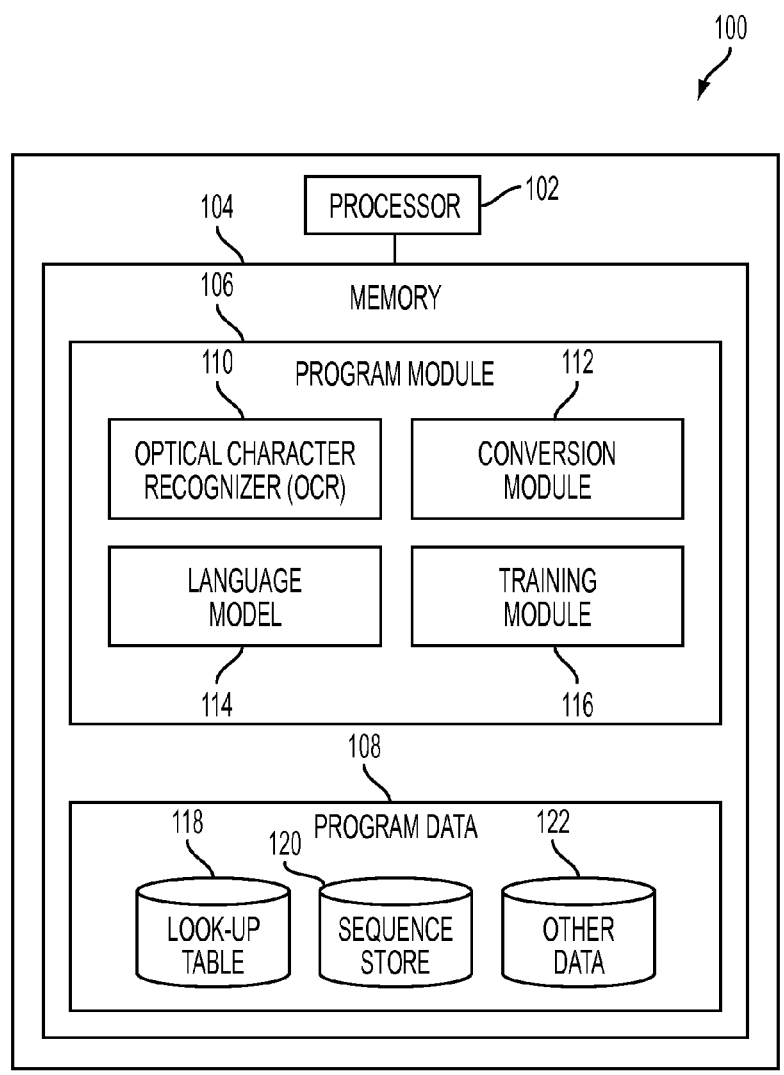
FIG. 1 is a block diagram illustrating a system for processing the output of an OCR in accordance with an embodiment.

FIG. 1 is a block diagram illustrating a system 100 for processing the output of an OCR in accordance with an embodiment. The system 100 includes a processor 102, a memory 104 coupled to the processor 102, a program module 106 and a program data 108 stored in the memory 104. The program module 106 includes an OCR 110, a conversion module 112, a language model 114, and a training module 116. The program data 108 includes a look-up table 118, a sequence store 120, and other data 122.

In order to translate a document, a user scans the document using a suitable scanner. The scanner then generates an electronic document, such as, a digital image of the document. The digital image of the document is then provided to the OCR 110. Further, it is understood that more than one document can be scanned without limiting the scope of the ongoing description.

In brief, the OCR 110 receives the digital image (e.g., the electronic document) and generates a first character sequence from the digital image. The OCR 110 stores the first character sequence in the sequence store 120. Once the first character sequence is generated, the conversion module 112 obtains the first character sequence from the sequence store 120. The conversion module 112 then functions in conjunction with the language model 114, the training module 116, and the look-up table 118 to convert the first character sequence into a second character sequence. The conversion module 112 then stores the second character sequence in the sequence store 120. In order for the conversion module 112 to perform the conversion, the training module 116 facilitates the generation of the look-up table 118. The look-up table 118 is referred by the conversion module 112 to identify appropriate character mapping for performing various corrections. The language model 114 calculates a language score for each possible correction. Thus, based on the look-up table 118 and the language score the conversion module 112 converts the first character sequence into the second character sequence.

The OCR 110 recognizes various characters present in the digital image and generates the first character sequence. For example, a first character sequence is further illustrated in FIG. 2a and FIG. 2b. A character sequence, such as, a first character sequence 202 appears at the output of the OCR 110. It is observed from FIG. 2a and FIG. 2b that the first character sequence 202 is erroneous and needs to be corrected. The OCR 110 stores the first character sequence 202 in the sequence store 120.

The conversion module 112 converts the first character sequence 202 into a corrected character sequence, such as, a second character sequence 204 with the possible corrections. In an embodiment, in order to correct the errors in the first character sequence 202, the conversion module 112 functions in conjunction with the language model 114, the training module 116, and the look-up table 118. Further, the first character sequence 202 and the second character sequence 204 are stored in the sequence store 120.

In an embodiment, various possible corrections includes, but are not limited to, addition of characters, removal of characters, replacement/transformation of characters, and so forth. In an embodiment, a character can be a space. In order to correct the errors in the first character sequence 202, the conversion module 112 converts a first set of characters in the first character sequence 202 to a corresponding second set of characters to generate the second character sequence 204 based on the look-up table 118 and language scores generated by the language model 114. In case of the addition of characters, the first set of characters contains no characters (e.g., the first set of characters is a null set) and the second set of characters contains one or more characters. In case of removal of characters, the first set of characters contains one or more characters and the second set of characters contains no characters (e.g., the second set of characters is a null set).

In an embodiment, the conversion module 112 can be implemented using a statistical machine translation (SMT) system (e.g., MOSES) for converting the first character sequence 202 into the second character sequence 204. The conversion is performed at character level using the lookup table 118 and the language scores generated by the language model 114. This is further explained in conjunction with FIG. 3 and FIG. 4.

In another embodiment, the conversion module 112 can be implemented using Open FST (a library for implementing weighted finite-state transducers) for converting the first character sequence 202 into the second character sequence 204 using an FST (Finite State Transducer) based technique. The conversion is performed using various FSTs and the language scores generated by the language model 114. This is further explained in conjunction with FIG. 6 and FIG. 7.

In another embodiment, a hybrid technique is used, where the conversion module 112 can be implemented using both the statistical machine translation (SMT) system (e.g., MOSES) and Open FST. The conversion is performed using various FSTs, the look-up table, and the language scores generated by the language model 114. This is further explained in conjunction with FIG. 3, FIG. 4, and FIG. 5.

The language model 114 is a statistical model that calculates a language score (e.g., probability value) of performing each possible correction. The language model 114 calculates the language score by implementing probability distribution technique. The calculated language scores in conjunction with the look-up table 118 are then used by the conversion module 112 to make corrections in the first character sequence 202 and generate the second character sequence 204. In an embodiment, the language scores are stored in the program data 108 as a part of the other data 122.

In an embodiment, the language model 114 is implemented using a language modeling technique, such as, an N-gram model. However, it is understood to those having ordinary skills in the art that any other suitable language modeling techniques (e.g., positional language model, discriminative language model, trigger based language model, and the like) can also be implemented by the language model 114. Further, the language model 114 is trained using SRILM toolkit (The SRI Language Modeling Toolkit by SRI International®).

The training module 116 facilitates the creation of the look-up table 118. In an embodiment, the training module 116 may be implemented using a tool like, GIZA++, that implements various IBM® models or HMM (Hidden Markov Models) for word-alignment. Various training data is provided to the training module 116, based on which the training module 116 extracts mappings of source characters and target characters. In an embodiment, the source characters include, but are not limited to, various alphabetic characters, numeric characters, symbols, and combination thereof, without limiting the scope of the ongoing description. Various characters present in first character sequence can be considered as the source characters. In an embodiment, target characters represent the characters that can replace the source characters. Further, the training module 116 computes one or more scores, such as, probability scores (e.g., P(T|S) as shown in FIG. 4a), and assigns the one or more scores to each of the extracted mappings to form the look-up table 118. Further, in accordance with another embodiment, various other suitable scores, such as, a probability of having a particular source character given a particular target character and various lexical scores are computed and assigned to the extracted mappings to generate the look-up table 118. Thus, the look-up table 118 may also include the other suitable scores and data in addition to P(T|S).

Figure 3:
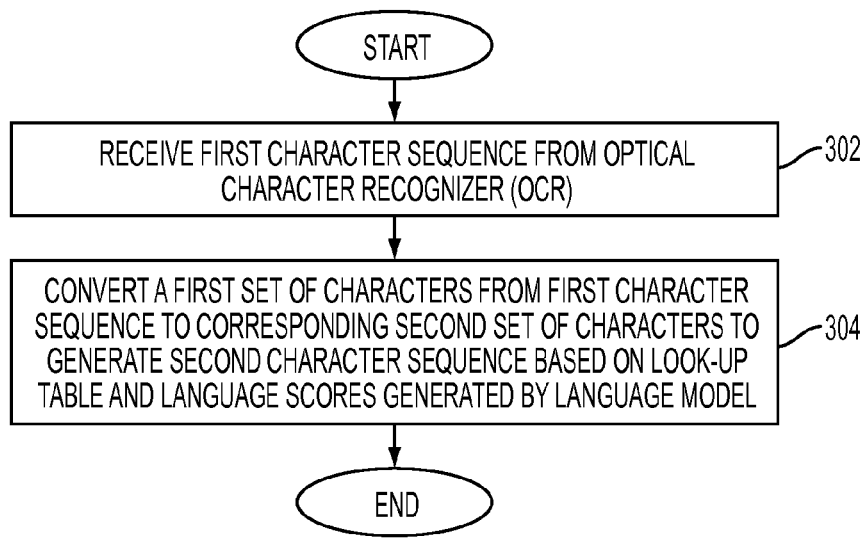
FIG. 3 is a flow diagram illustrating a method for processing the output of an OCR in accordance with an embodiment.

Further, the method for processing the first character sequence 202 is explained in detail in conjunction with FIG. 3.

Figure 2A:
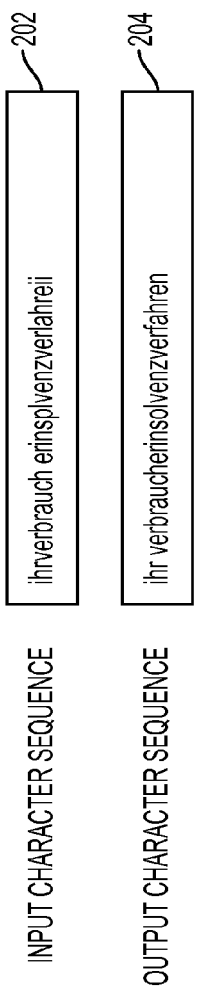
FIG. 2a and FIG. 2b illustrate an input character sequence and an output character sequence in accordance with an embodiment.
Figure 2B:
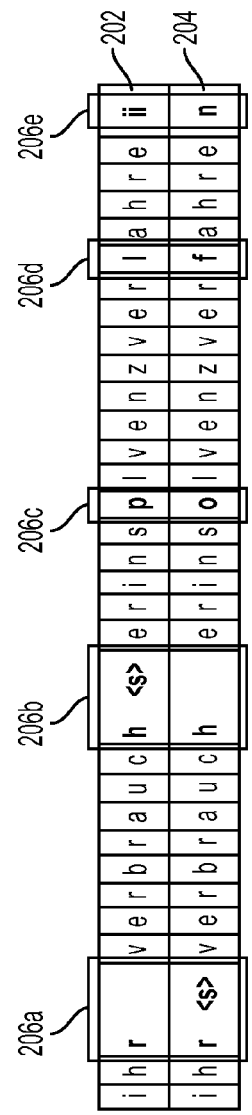

FIG. 2a and FIG. 2b illustrates an input character sequence and an output character sequence in accordance with an embodiment. The first character sequence 202 represents the input character sequence fed to the conversion module 112. In an embodiment, the first character sequence 202 is in German language. It is apparent to a person skilled in the art that any other character sequence in any other language can be processed by the conversion module 112 without limiting the scope of the ongoing description.

The output character sequence of the conversion module 112 is represented by the second character sequence 204. The second character sequence 204 represents a corrected version of the first character sequence 202.

Various corrections, such as, corrections 206a, 206b, 206c, 206d, and 206e, hereinafter referred to as corrections 206, are illustrated in FIG. 2b. For example, the correction 206a depicts that a third character "r" (from the left) in the first character sequence 202 needs to be replaced by "r<s>", where <s> represents a single space. The correction 206b depicts that characters "h<s>" in the first character sequence 202 needs to be replaced by "h". The correction 206c depicts that the character "p" in the first character sequence 202 needs to be replaced by "o". The correction 206d depicts that the character "l" in first character sequence needs to be replaced by "f". Similarly, the correction 206e depicts that the characters "ii" in the first character sequence 202 needs to be replaced by "n". In addition to the corrections 206, other corrections include deletion (e.g., replacing a character with zero or no character) and addition (e.g., replacing no character with a character OR including an extra character). As disclosed earlier, the conversion is being made by the conversion module 112.

FIG. 3 is a flow diagram illustrating a method for processing the output of the OCR 110 in accordance with an embodiment.

At step 302, a character sequence, such as, the first character sequence 202 is received from the OCR 110.

At step 304, the first set of characters from the first character sequence 202, are converted to corresponding at second set of characters to generate the second character sequence 204 based on the look-up table 118 and language scores generated by the language model 114. This is further explained in the following description. The conversion is performed by the conversion module 112.

Various corrections, such as, the corrections 206 are made based on the language scores computed by the language model, the mappings, and various scores (e.g., P(T|S)) in the look-up table (e.g., 118a, 118b as shown in FIG. 4).

FIG. 4a depicts a look-up table 118a in accordance with an embodiment. The look-up table 118a includes various possible target characters corresponding to a source character "r". A first column in the look-up table 118a represents the source character "r". A second column in the look-up table 118a represents possible target characters corresponding to the source character "r". A third column in the look-up table 118 represents probability scores, such as, P(T|S). The probability scores represent a probability of using the possible target characters for correcting each source characters. In the look-up table 118a, P(T|S) represents a probability of a particular target character (e.g., "<s>r", "e r", "e") replacing the source character "r". The look-up table 118a can be referred by the conversion module 112 in conjunction with the corresponding language score provided by the language model 114 to replace the character "r" in the first character sequence 202 by "r<s>", where <s> represents a space.

FIG. 4b depicts another look-up table 118b in accordance with an embodiment. The look-up table 118b includes various possible target characters corresponding to a source character "p". A first column in the look-up table 118a represents the source character "p". A second column in the look-up table 118a represents the possible target characters corresponding to the source character "p". A third column in the look-up table 118a represents probability scores P(T|S). In the look-up table 118b, P(T|S) represents a probability of a particular target character (e.g., p, "<s>p", d) replacing the source character "p". The look-up table 118a can be used by the conversion module 112 to replace the character "p" in the first character sequence 202 by "o" in conjunction with the score provided by the language model 114.

It is apparent to a person skilled in the art that the look-up tables 118a and 118b may be stored separately or combined in a single look-up table, such as, the look-up table 118, in the program data 108. Further, the look-up table 118 may include various possible target characters with their respective probability scores for all possible source characters. Source characters can include, but are not limited to, various alphabetic characters, numeric characters, symbols, and combination thereof, without limiting the scope of the ongoing description.

A language score is calculated for each possible correction by the language model 114. In an embodiment, the language score is a probability value. For example, for each possible replacement for the source character "r" as depicted in the look-up table 118a, the language score is calculated and stored in the other data 122. Further, language scores for possible correction are calculated based on the training. This is further explained below.

For example, in order to calculate the language score for "r<s>" being the replacement for "r", language score "i h r<s> v e r b" is calculated by the language model 114 based on the initial training. Similarly, language scores corresponding to each possible target characters listed in the look-up table 118a is calculated.

For example, the language score for the sequence "ihr verbraucherinsolvenzverfahren" (e.g., the second character sequence 204) can be calculated using following equation:

$$P(\text{``ihr verbraucherinsolvenzverfahren''}) = p(i|\text{<start>})*p(h|\text{<start>}i)*p(r|ih)* p(\text{<s>}|hr)* \ldots *p(n|re) \quad \text{Equation 1}$$

where, P("ihr verbraucherinsolvenzverfahren") represents the language score for the entire sequence; p(i|<start>) represents the language score (e.g., a probability value) for "i" being the first character; p(h|<start>i) represents the language score for "h" following "i" being the first character; p(r|ih) represents the language score for "r" following "ih", and so on.

In an embodiment, if the language scores cannot be estimated well directly from data (e.g., data used to train the language model 114 and data present in the look-up table 118, such as, look-up tables 118*a* and 118*b*), certain smoothing techniques are used to adjust the values of these language scores.

Based on all such calculated language scores and the probability scores present in the look-up table 118*a*, "r<s>" is determined as the best possible replacement for the character "r" in the first character sequence 202 by the conversion module 112. Similarly, other corrections, such as, the corrections 206*b*, 206*c*, 206*d*, and 206*e* are made by the conversion module 112.

In another embodiment, the hybrid technique (e.g., an FST based technique in conjunction with the look-up table 118) is used by the conversion module 112 to process the first character sequence 202. So that, a search space (e.g., possible transformations for a given source character) is limited to the mappings present in the look-up table 118. The possible transformations for a given character in the first character sequence 202 are derived based on the possible target characters present in the look-up table 118.

Figure 5A:
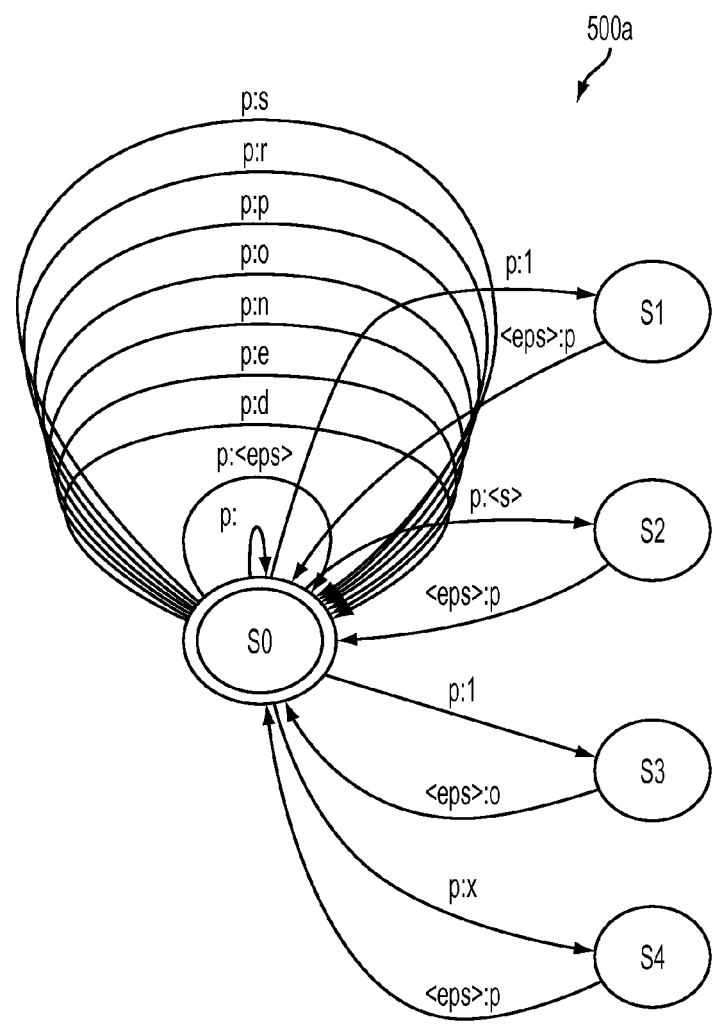
FIG. 5a illustrates a Finite State Transducer (FST) in accordance with an embodiment.

FIG. 5*a* illustrates an FST 500*a* in accordance with an embodiment. The FST 500*a* depicts possible transformations for character "p" based on the look-up table 118*b*.

It is observed from the FST 500*a* that the possible target characters listed in the look-up table 118*b* are considered by the conversion module 112. The FST 500*a* includes various pre-defined states, such as, S0, S1, S2, S3, and S4. In an embodiment, states S1, S2, S3, and S4 are intermediate states.

Similarly, such FSTs for replacement of character "r" can be derived based on the look-up table 118*a*. In general, an FST for each source characters including, but, not limited to, various alphabetic characters, numeric characters, symbols, and combination thereof, can be defined without limiting the scope of the ongoing description. Further, it is understood that the states explained in FIG. 5 are just examples and the number of states and corresponding definition of the states may vary. Also, they may be defined by the user or may be defined or based on a training program.

Figure 5B:
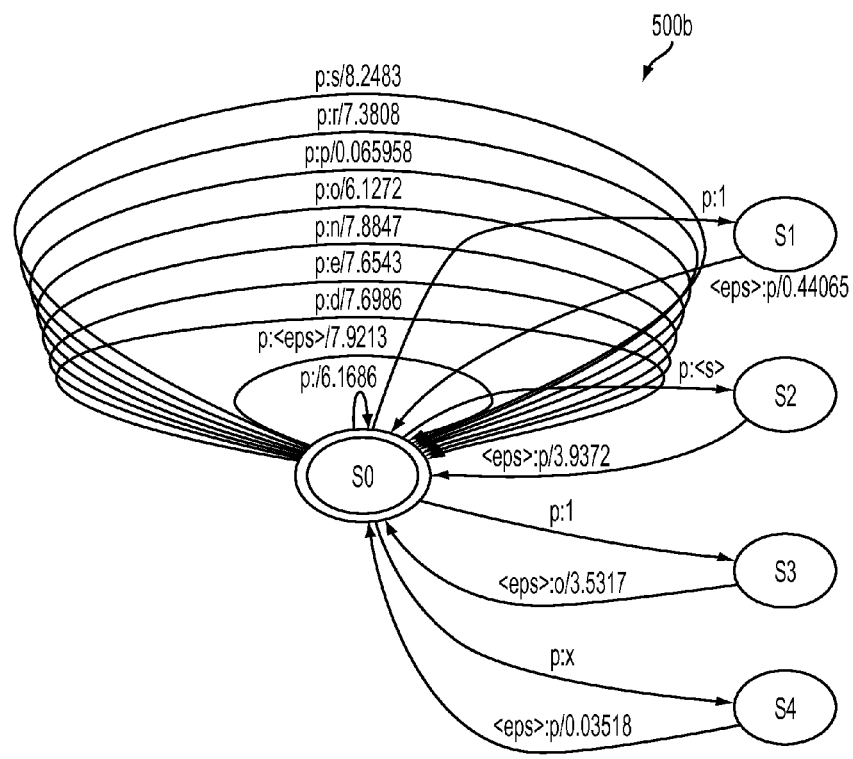
FIG. 5b illustrates another FST in accordance with an embodiment.

FIG. 5*b* illustrates an FST 500*b* in accordance with an embodiment. The FST 500*b* depicts possible transformations for character "p" based on the look-up table 118*b* and various costs. The various costs can also be considered while defining any FSTs. The FST 500*b* depicts the cost corresponding to each transformation. The cost corresponds to a value indicating a likelihood of the one or more source characters from the first character sequence being replaced with the corresponding at least one target character. For example, the cost of converting "p" to "s" is 8.2483 which is much higher than the cost of converting "p" to "p" which is 0.065958. This indicates that it is less likely that "p" is converted to "s" as the corresponding cost is higher.

In an embodiment, each such FST (e.g., the FST 500*a* or The FST 500*b*) for source characters and the language model 114 are assigned weights relative to each other, where weights represent relative importance of the scores generated by the language model 114 and various transformations proposed by the FST 500*a*. In an embodiment, the weights of the FST 500*a* and the language model 114 are determined using a Minimum Error Rate Training (MERT) technique.

Based on the defined FSTs (e.g., the FST 500*a* or The FST 500*b*) and the language scores provided by the language model 114, the second set of characters (e.g., containing appropriate target characters from the look-up table 118 or no characters) for the first set of characters in the first character sequence 202 are determined by the conversion module 112. The corrections 206 are then made to generate the second character sequence 204. In an embodiment, the weights associated with the FSTs and the language model 114 are considered by the conversion module 112 to identify the second set of characters for the first set of characters in the first character sequence 202.

Figure 6A:
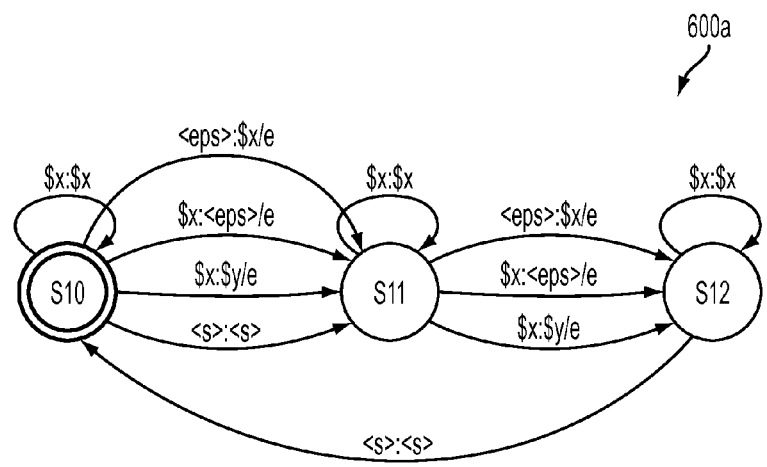
FIG. 6a illustrates another FST in accordance with an embodiment.

FIG. 6*a* illustrates another FST 600*a* in accordance with an embodiment. The FST 600*a* represents an edit FST. Such, FST is used to perform all possible edit operations in the first character sequence 202.

Figure 6B:
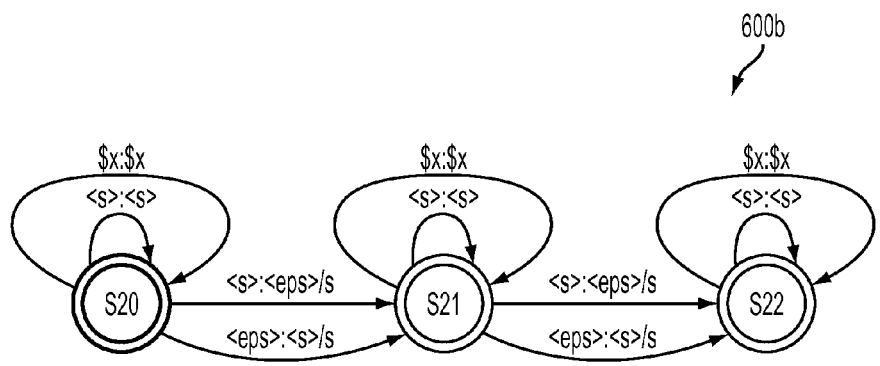
FIG. 6b illustrates yet another FST in accordance with an embodiment.

FIG. 6*b* illustrates yet another FST 600*b* in accordance with an embodiment. The FST 600*b* represents segmentation FST. The FST 600*b* is used to perform all possible segmentation operations in the first character sequence 202.

In an embodiment, the FST 600*a* and the FST 600*b* are used in conjunction with the language model 114 to convert the first character sequence 202 into the second character sequence 204 and the use of the look-up table 118 by the conversion module 112 is avoided.

The FST 600*a* is implemented by the conversion module 112 to generate various possible edits of the input character sequence (e.g., the first character sequence 202), one of which represents the corrected version of the input character sequence. The various possible edits of the input character sequence are obtained through various operations, such as, character replacement, character deletion, and character addition. These three operations are represented using three different types of arcs, such as, <$x:$y>, <$x:<eps>>, and <<eps>:$x>, respectively. Where, "x" represents one or more character to be replaced. "y" represents different one or more characters that can be used to replace the character. <eps> represents zero (or no) character. The arc <$x:$y> suggests that the one or more character should be replaced by the different one or more characters. For example, "r" can be replaced by "r<s>", "p" can be replaced by "o", and so forth. The arc <$x:<eps>> suggests that a character be deleted. The arc <<eps>:$x> suggests that a new character be added. Each of these operations is associated with an edit cost. The FST 600*a* includes various pre-defined states, such as, S10, S11, and S12. However, different number of states can also be defined.

If all possible edits to the input character sequence are permitted, the number of possible candidate corrections will become very high in number. In an embodiment, in order to restrict search space, the number of edits per word can be restricted to a certain number (e.g., two edits per word).

The FST 600*b* is implemented by the conversion module 112 to make a set of segmentation changes to various character sequences generated by the edit FST (the FST 600*a*). The operations performed by the FST 600*b* include removal of space (represented by an arc<<s>:<eps>>), and introduction of a space to split a word (represented by an arc <<eps>:<s>>). In an embodiment, the number of segmentation changes in the input character sequence is restricted in order to make this operation computationally feasible. For example, in the FST 600*b* the number of segmentation changes is restricted to two. "s" represents a segmentation cost. In an embodiment, s=1. The FST 600*a* includes various pre-defined states, such as, S20, S21, and S22. However, different number of states can also be defined.

Figure 7:
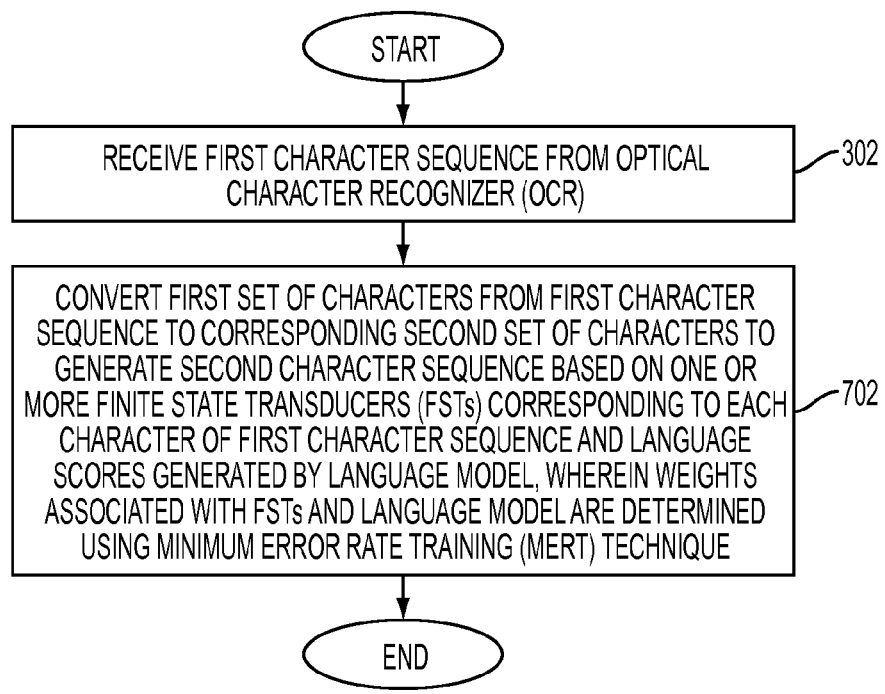
FIG. 7 is a flow diagram illustrating a method for processing the output of an OCR in accordance with an embodiment.

FIG. 7 is a flow diagram illustrating a method for processing the output of the OCR 110 in accordance with an embodiment.

As explained earlier, at step 302 a character sequence, such as, the first character sequence 202 is received from the OCR 110.

At step 702, the first set of characters from the first character sequence 202 are converted to the corresponding second set of characters to generate the second character sequence 204 based on the FSTs (e.g., the FST 600a and 600b) corresponding to each character of the first character sequence 202 and the language scores generated by the language model 114. One or more weights of the FSTs and the language model 114 are determined using the MERT technique. Each of the FSTs (e.g., 600a and 600b) and the language model 114 used to transform the input sequence are weighted relative to each other. Let We, Ws and Wl be the relative weights for the editing FST (the FST 600a), the segmenting FST (the FST 600b) and the language model, respectively. Let Ce, Cs and Cl be the costs of transforming the input character sequence to obtain a correction. A score of the output is computed as $$S(o,W) = -(W_e * C_e + W_s * C_s + W_l * C_l) \qquad \text{Equation 2}$$

where, "o" represents an output character sequence and "W" represents the weights.

The output character sequence "o" (e.g., the second character sequence 204) given an input character sequence (e.g., the first character sequence 202) is computed as, $$o = \operatorname{argmax} o\ S(o,W) \qquad \text{Equation 3}$$

where, "o"={o}1N, N=number of segments (or words) in the input character sequence (e.g., the first character sequence 202), W={We, Ws, Wl}.

The weights W={We, Ws, Wl} are calculated by minimizing the error of prediction using the MERT technique. In an embodiment, following formula can be used to calculate the weights:

$$W = \operatorname{argmin} W\ E(o,R) \qquad \text{Equation 4}$$

where, E(o, R) represents the error of prediction and 'R' represents a reference text. The output character sequence "o" is compared with the reference text to compute the error of prediction. The weights W are calculated based on the error of prediction.

The above mentioned technique can also be used to calculate weights for The FST 500a and the FST 500b.

Figure 8:
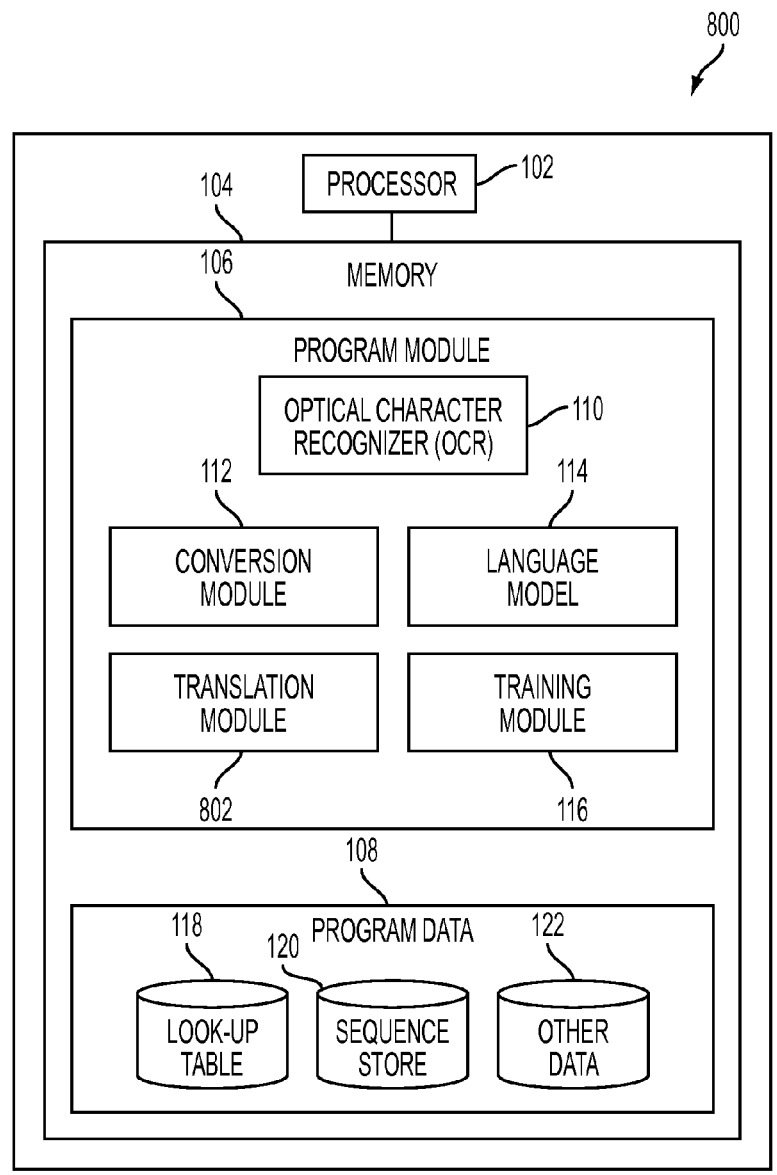
FIG. 8 is a block diagram illustrating a system for language translation in accordance with an embodiment.

FIG. 8 is a block diagram illustrating a system 800 for language translation in accordance with an embodiment. The system 800 includes various modules illustrated to be a part of the system 100 (refer to FIG. 1) and using the same reference numbers, except for a translation module 802. The modules referenced with same numbers in FIG. 8 as that of the system 100 are connected in similar fashion and functions in a similar manner as explained in FIG. 1 and FIG. 3.

Figure 9:
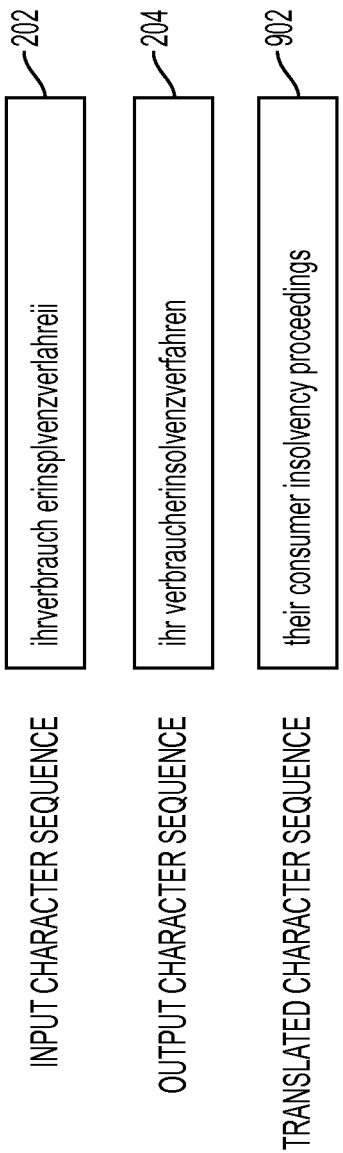
FIG. 9 illustrates an input character sequence, an output character sequence, and a translated character sequence in accordance with an embodiment.

The translation module 802 receives a character sequence, such as, the second character sequence 204, from the conversion module 112. In an embodiment, the translation module 802 then translates a first word sequence of the second character sequence 204 to a corresponding translated word sequence, such as, a second word sequence 902 in English, as depicted in FIG. 9. FIG. 9 illustrates the input character sequence (e.g., the first character sequence 202), the output character sequence (e.g., the second character sequence 204), and the translated character sequence (e.g., the second word sequence 902) in accordance with an embodiment. In an embodiment, the first word sequence corresponds to a word sequence in the second character sequence 204. It is understood that the first word sequence can be converted into any other language as well, without limiting the scope of the ongoing description.

In an embodiment, the translation module 802 may be implemented using the MOSES. It is apparent to a person skilled in the art that any other suitable machine translation systems (e.g., Google® Translate, Google® Translator Toolkit, Bing® Translator, and the like) can also be used without limiting the scope of the ongoing description.

Figure 10:
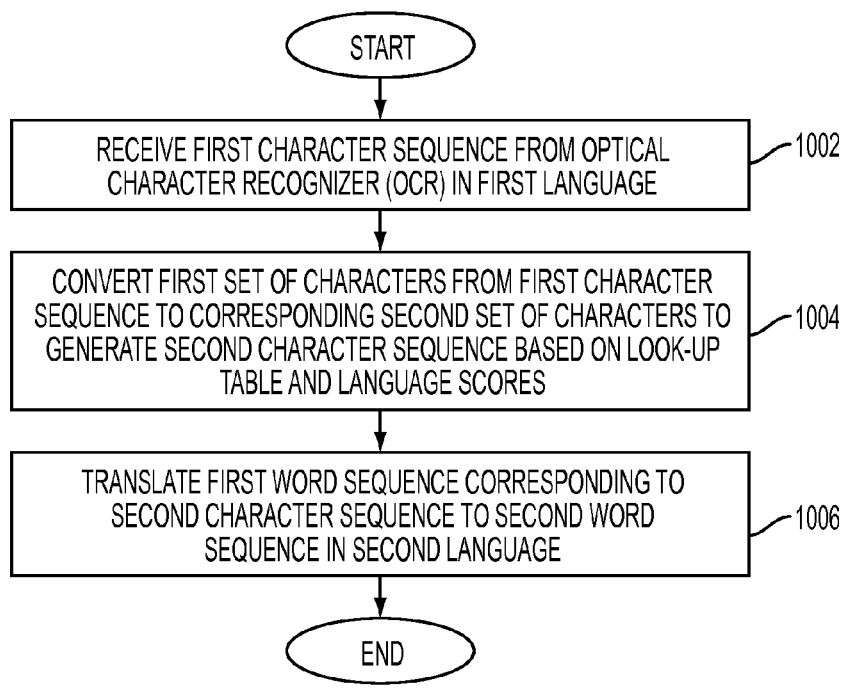
FIG. 10 is a flow diagram illustrating a method for language translation in accordance with an embodiment.

FIG. 10 is a flow diagram 1000 illustrating a method for language translation in accordance with an embodiment.

At step 1002, a character sequence, such as, the first character sequence 202 in a first language is received from the OCR 110. In an embodiment explained supra, the first language is German.

At step 1004, the first set of characters from the first character sequence 202 are converted to the corresponding second set of characters to generate the second character sequence 204 based on a look-up table (e.g., the look-up table 118) and the language scores generated by the language model 114. Further, the method of converting the first character sequence 202 into the second character sequence 204 is explained in the description supra.

At step 1006, the first word sequence corresponding to the second character sequence 204 is translated to the second word sequence 902 in the second language. As depicted in FIG. 9, the second word sequence 902 represents a translated word sequence in English language. As explained earlier, such translations can be performed by a system program module, such as, the translation module 802.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer readable instructions may include various commands that instruct the processing machine to perform specific tasks, such as, the steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the disclosure. The software may also include modular programming in the form of object-oriented programming. The processing of input data by the processing machine may be in response to user commands, results of previous processing or a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

The method, system, and computer program product, as described above, have numerous advantages. Some of these advantages may include, but are not limited to, a minimization of OCR errors and efficient machine translation. The output of the OCR is processed by the system and a corrected character sequence is supplied to the MT system. Hence, a correct translation can be achieved at the output of the MT system. Character level processing (i.e., corrections) of the OCR output using the look-up table and the language model provides improved results. Further, the use of the MERT technique to compute the relative weights of the FSTs and language model also helps achieve high quality corrections. Further, the use of the hybrid technique performs faster than the conventional FST based techniques as the overall search space of FST is reduced by using the look-up table.

It will be appreciated by a person skilled in the art that the system, modules, and sub-modules have been illustrated and explained to serve as examples and should not be considered limiting in any manner. It will be appreciated that the variants of the above disclosed system elements, or modules and other features and functions, or alternatives thereof, may be combined to create many other different systems or applications.

In an embodiment, the OCR software converts documents into ASCII format; however, alternate embodiments may use various common electronic formats, such as, but not limited to, XML, HTML, PDF, GIF, JPEG, or any other machine-readable format.

The word "scanner" used herein encompasses any apparatus, such as, a digital imager, a copier, and a multi-function machine, which performs a scan output function for any purpose.

Those skilled in the art will appreciate that any of the foregoing steps and/or system modules may be suitably replaced, reordered, or removed, and additional steps and/or system modules may be inserted, depending on the needs of a particular application, and that the systems of the foregoing embodiments may be implemented using a wide variety of suitable processes and system modules and is not limited to any particular computer hardware, software, middleware, firmware, microcode, etc.

Various embodiments of the method and system for processing the OCR output have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It will be appreciated by a person skilled in the art that the system, modules, and sub-modules have been illustrated and explained to serve as examples and should not be considered limiting in any manner. It will be appreciated that the variants of the above disclosed system elements, or modules and other features and functions, or alternatives thereof, may be combined to create many other different systems or applications.

The claims can encompass embodiments for hardware, software, or a combination thereof.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implemented method for processing an output of an optical character recognizer (OCR), the computer implemented method comprising:
    receiving an OCR-converted character sequence from the OCR; and
    converting a set of OCR-converted characters of the OCR-converted character sequence to a corresponding corrected set of characters to generate a corrected character sequence based on:
    a probability of replacing an OCR-converted character of the set of OCR-converted characters with one or more target characters to form one or more characters of the corrected set of characters, and
    language scores generated by a language model.

2. The computer implemented method of claim 1, further comprising scanning a document to generate an electronic document, wherein the electronic document is optically recognized by the OCR to generate the OCR-converted character sequence.

3. The computer implemented method of claim 1, further comprising optically recognizing characters from an electronic document to generate the OCR-converted character sequence.

4. The computer implemented method of claim 1, wherein a list of OCR-converted characters and the corresponding one or more target characters is stored in a look-up table.

5. The computer implemented method of claim 1, wherein the converting comprises implanting a finite state transducer (FST) corresponding to each character of the OCR-converted character sequence.

6. The computer implemented method of claim 5, further comprising assigning weights to the FST and the language model using a Minimum Error Rate Training (MERT) technique.

7. A computer implemented method for processing an output of an optical character recognizer (OCR), the computer implemented method comprising:

receiving a first character sequence from the OCR,
converting a first set of characters from the first character sequence to a corresponding second set of characters to generate a second character sequence based on one or more finite state transducers (FSTs) corresponding to each character of the first character sequence and language scores generated by a language model, wherein weights associated with the one or more FSTs and the language model are determined using a Minimum Error Rate Training (MERT) technique, wherein a number of edits for the conversion of the first set of characters to the corresponding second set of characters is less than or equal to a predetermined number of edits.

8. A computer implemented method for language translation comprising:
receiving an Optical Character Recognizer (OCR)-converted character sequence from an OCR, the OCR-converted character sequence being in a first language;
converting a set of OCR-converted characters of the OCR-converted character sequence to a corresponding corrected set of characters to generate a corrected character sequence based on a look-up table and language scores generated by a language model, wherein the corrected character sequence is in the first language, wherein the look-up table comprises a probability score for each character of the set of OCR-converted characters, wherein the probability score represents a probability of replacing an OCR-converted character of the set of OCR-converted characters with one or more target characters to form one or more characters of the corrected set of characters; and
translating an OCR-converted word sequence corresponding to the corrected character sequence to a corrected word sequence in a second language.

9. A system for processing an output of an optical character recognizer (OCR), the system comprising a processor coupled to a memory, the memory having stored therein one or more program modules comprising:
a conversion module configured to convert an OCR-converted set of characters in an OCR-converted character sequence to a corresponding corrected set of characters to generate a corrected character sequence based on a look-up table and language scores, wherein the OCR-converted character sequence is received from the OCR, wherein the look-up table comprises a probability score for each character of the set of OCR-converted characters, wherein the probability score represents a probability of replacing an OCR-converted character of the set of OCR-converted characters with one or more target characters to form one or more characters of the corrected set of characters.

10. The system of claim 9, wherein the OCR is configured to optically recognize characters from an electronic document to generate the OCR-converted character sequence.

11. The system of claim 9, wherein the look-up table comprises a list of OCR-converted characters and the corresponding one or more target characters.

12. The system of claim 9 wherein, the conversion module is configured to convert the OCR-converted set of characters to the corrected set of characters based on a cost, wherein the cost corresponds to a value indicating a likelihood of the OCR-converted set of characters of the OCR-converted character sequence being the corrected set of characters.

13. The system of claim 9, further comprising a language model configured to calculate the language scores.

14. A system for language translation, the system comprising a processor coupled to a memory, the memory having stored therein one or more program modules comprising:
a conversion module configured to convert an Optical Character Recognizer (OCR)-converted set of characters in an OCR-converted character sequence to a corresponding corrected set of characters to generate a corrected character sequence based on a look-up table and language scores generated by a language model, the OCR-converted character sequence being received from an OCR, wherein the OCR-converted character sequence and the character sequence are in a first language, wherein the look-up table comprises a probability score that represents a probability of replacing an OCR-converted character of the set of OCR-converted characters with one or more target characters to form one or more characters of the corrected set of characters; and
a translation module configured to translate an OCR-converted word sequence corresponding to the corrected character sequence to a corrected word sequence in a second language.

15. The computer implemented method of claim 8, wherein the look-up table is generated by extracting a plurality of mappings of each character of the set of OCR-converted characters with the one or more target characters to compute and assign the probability score to each of the extracted plurality of mappings.

16. The computer implemented method of claim 8, wherein the language scores are based on a probability of a character in the corrected character sequence following a pre-determined sequence of one or more characters.

17. The computer implemented method of claim 16, wherein the language scores are based on a product of the probability of each character in the corrected character sequence following the pre-determined sequence of one or more characters for the entire corrected character sequence.

18. The computer implemented method of claim 5, wherein the FST corresponding to each character of the OCR-converted character sequence is associated with a plurality of costs corresponding to a plurality of possible replacements of the OCR-converted character of the set of OCR-converted characters to the one or more target characters.

19. The computer implemented method of claim 18, wherein each of the plurality of costs represents a value such that a likelihood of replacing the OCR converted character of the set of OCR-converted characters with the one or more target characters is inversely proportional to the value of the corresponding cost.

20. The system of claim 9, further comprising a training module configured to generate the look-up table by extracting a plurality of mappings of each character of the set of OCR-converted characters with the one or more target characters to compute and assign the probability score to each of the extracted plurality of mappings.

* * * * *